(12) United States Patent
Ashoori et al.

(10) Patent No.: US 10,915,620 B2
(45) Date of Patent: *Feb. 9, 2021

(54) PAINT ON MICRO CHIP TOUCH SCREENS

(71) Applicant: INTERNATIONAL BUSINESS MACHINES CORPORATION, Armonk, NY (US)

(72) Inventors: Maryam Ashoori, White Plains, NY (US); Benjamin D. Briggs, Waterford, NY (US); Justin A. Canaperi, Averill Park, NY (US); Lawrence A. Clevenger, Saratoga Springs, NY (US); Leigh Anne H. Clevenger, Rhinebeck, NY (US); Michael Rizzolo, Delmar, NY (US); Spyridon Skordas, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,070

(22) Filed: Jul. 3, 2019

(65) Prior Publication Data

US 2019/0325127 A1 Oct. 24, 2019

Related U.S. Application Data

(63) Continuation of application No. 15/608,437, filed on May 30, 2017, now Pat. No. 10,404,306.

(51) Int. Cl.
| | |
|---|---|
| G06F 21/35 | (2013.01) |
| G06F 3/044 | (2006.01) |
| G06K 19/07 | (2006.01) |
| G06K 19/077 | (2006.01) |
| G07C 9/00 | (2020.01) |
| H04B 1/3827 | (2015.01) |

(52) U.S. Cl.
CPC ........... *G06F 21/35* (2013.01); *G06F 3/044* (2013.01); *G06K 19/0723* (2013.01); (Continued)

(58) Field of Classification Search
CPC .............. G06F 21/35; G06F 3/044; G06F 2203/04103; G06K 19/0723; (Continued)

(56) References Cited

U.S. PATENT DOCUMENTS

| | | |
|---|---|---|
| 6,281,314 B1 | 8/2001 | Tong et al. |
| 9,268,535 B2 | 2/2016 | Shi |

(Continued)

FOREIGN PATENT DOCUMENTS

| | | |
|---|---|---|
| CN | 1245181 A | 2/2000 |
| CN | 205375444 U | 7/2016 |

(Continued)

OTHER PUBLICATIONS

List of IBM Patents or Patent Applications Treated as Related dated Jul. 3, 2019, 2 pages.

(Continued)

*Primary Examiner* — Wing H Chow
(74) *Attorney, Agent, or Firm* — Tutunjian & Bitetto, P.C.; Kurt Goody

(57) ABSTRACT

A system for a touch screen interface that includes a coating including a plurality of a touch activated microchips; and a projector for projecting a light image onto the coating that is applied to a touch screen substrate. The system also includes an image calibrator that calibrates touch activated microchips in the coating to features of the light image projected onto the coating. The system further includes a receiver for receiving signal from the touch activated microchips when said feature of the light image is activated.

20 Claims, 6 Drawing Sheets

(52) U.S. Cl.
CPC ... *G06K 19/07775* (2013.01); *G07C 9/00182* (2013.01); *H04B 1/3833* (2013.01); *B01L 2300/168* (2013.01); *G06F 2203/04103* (2013.01)

(58) Field of Classification Search
CPC .......... G06K 19/07775; G07C 9/00182; H04B 1/3833; B01L 2300/168
See application file for complete search history.

(56) References Cited

U.S. PATENT DOCUMENTS

| | | |
|---|---|---|
| 9,535,557 B2 | 1/2017 | Bernstein et al. |
| 2008/0192017 A1 | 8/2008 | Hildebrandt et al. |
| 2015/0095883 A1 | 4/2015 | Shi |
| 2015/0103269 A1 | 4/2015 | Suganuma et al. |
| 2015/0123569 A1 | 5/2015 | Knaapen et al. |
| 2016/0326388 A1 | 11/2016 | Petcavich et al. |

FOREIGN PATENT DOCUMENTS

| | | |
|---|---|---|
| CN | 105917293 A | 8/2016 |
| CN | 106046555 A | 10/2016 |
| JP | 2009259063 A | 11/2009 |
| KR | 1020160027442 A | 3/2016 |
| TW | 585875 B | 5/2004 |
| WO | 2014070131 A1 | 5/2014 |

OTHER PUBLICATIONS

U.S. Appl. No. 15/608,437, filed May 30, 2017.
International Search Report and Written Opinion issued in International Application No. PCT/IB2018/053808, dated Sep. 27, 2018, pp. 1-9.

PAINT ON MICRO CHIP TOUCH SCREENS

BACKGROUND

Technical Field

The present invention generally relates to interfaces with computers, and more particularly to touch interfaces with computers.

Description of the Related Art

A touch screen panel is an input device capable of inputting a user's instruction by selecting instruction contents displayed on a screen of an image display device, or the like, with a human's hand or an object. To this end, the touch screen panel is provided on a front surface of the image display device to convert a contact position directly contacted by the human hand or the object into an electric signal. Therefore, the instruction contents selected at the contact position is recognized as an input signal. Since the touch screen panel may be substituted for a separate input device operating by being connected to the image display device, such as a keyboard or a mouse, application fields thereof have been gradually extended. Types implementing the touch screen panel may include, e.g., a resistive type touch screen panel, a photosensitive type touch screen panel, a capacitive type touch screen panel, and the like.

SUMMARY

In some embodiments, a method of providing a touch screen is described herein. In one embodiment, the method for forming the touch screen may include applying a coating including a plurality of radio frequency sensitive microchips to a substrate for a touch screen. An image for a touch screen interface is produced on the substrate for the touch screen. The radio frequency sensitive microchips are calibrated to features of the image for the touch screen interface. Radio frequency activation of the radio frequency sensitive microchips that are calibrated to the features of the image activates said features.

In another embodiment, a method of providing a touch screen is described herein that employs pressure sensitive microchips applied using a coating method. In one embodiment, the method for forming the touch screen may include applying a coating including a plurality of pressure sensitive microchips to a substrate for a touch screen. An image for a touch screen interface is produced on the substrate for the touch screen. The pressure sensitive microchips are calibrated to features of the image for the touch screen interface. Pressure activation of the pressure sensitive microchips that are calibrated to the features of the image activates said features.

In yet another embodiment, a system for a touch screen interface is provided that includes a projector for projecting at least one light image onto a coating that is applied to a touch screen substrate that includes a plurality of touch activated microchips, wherein the at least one light image includes a touch screen image including activation fields for a function; and an image calibrator that calibrates touch activated microchips in the coating to the at least one light image being projected. The system can further include a receiver for receiving signal from the touch activated microchips when said feature of the light image is activated. In some embodiments, the system includes an activated microchip to selected feature actuator to correlate a signal received by the receiver from an touch activated microchip that a user of the touch screen interface has selected the activation field for the function. The system further includes a transmitter of activated feature signal from the touch activated microchips that sends a signal to a computer interfacing with the touch screen interface instructing that the activation field for the function has been selected.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
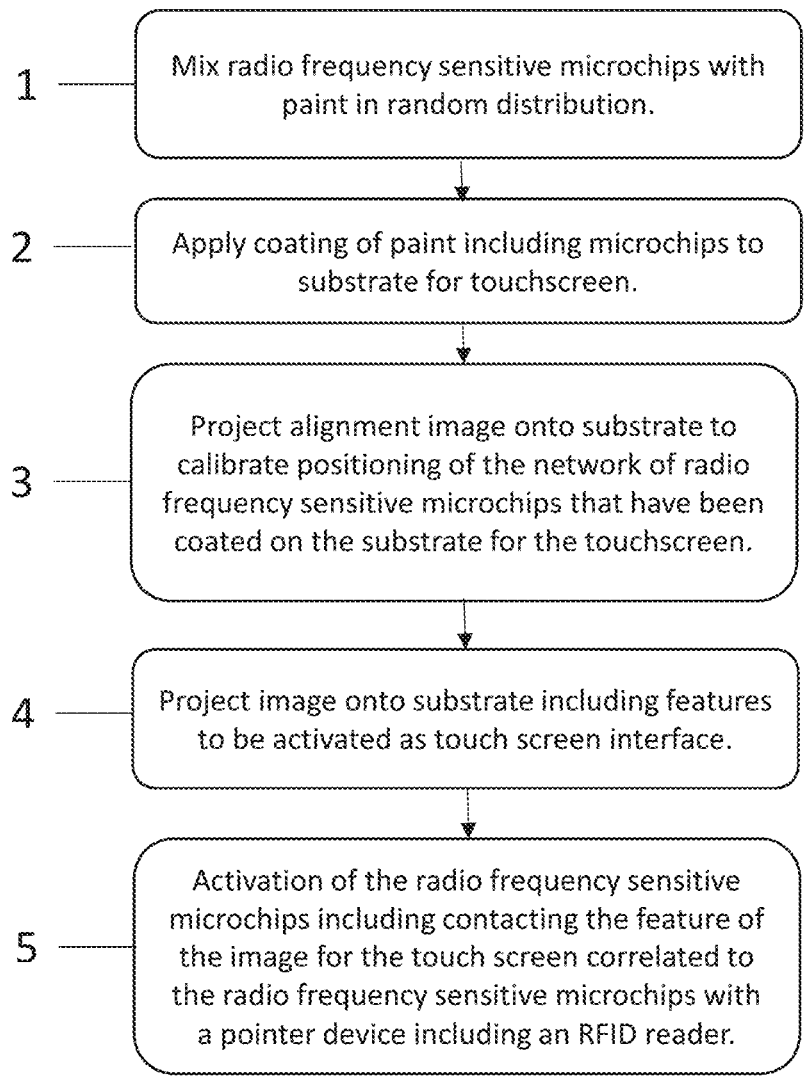
FIG. 1 is a flow diagram showing a method of providing a touch screen using frequency sensitive microchips applied in a coating of paint, in accordance with an embodiment of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, methods, structures and systems are described herein that can provide touch sensitive layer that can be coated, e.g., painted, onto any substrate surface, e.g., flat surface. The touch sensitive layers that are described herein can provide a touch screen interface with a computer when an image is projected thereon. In an embodiment, an enamel pain saturated with low power, capacitance sensing, near field communication microchips can be sprayed on a substrate that can provide the surface for a touch screen for interaction with a computer. The plurality of microchips can be arranged in a mesh network, which in some examples may be referred to as a grid. In addition to application through paining, the plurality of microchips can also be dispersed or affixed to a wall covering, such as a polymeric sheet or wall paper, which is then bonded to a substrate surface that is to provide the substrate for the touch screen being formed. In some embodiments, communication may be made by radio frequency, e.g., radio frequency identification (RFID) methods. In accordance with the methods, structures and systems that are described herein, an image is projected onto the coated surface including the touch sensitive microchips, wherein the image includes fields that can be activated by a touch type interface. For example, when the touch sensitive microchips include an RF coil, as used in RFID applications, the field of the image can be activated by an RFID reader that communicates with touch sensitive microchips through radio frequency communications. In other examples, when the touch sensitive microchips include pressure sensitive capacitors, fields of the image being displayed on the coated network of microchips may be activated by the user contacting the displayed field by touch, e.g., finger type touch. The methods, structures and systems that are described herein can provide for a touch screen that can be any size desired by the user that can be applied by painting or wall covering on a wall substrate. Further details of the methods, structures and systems summarized above are provided with greater detail in reference to FIGS. 1-6.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates one embodiment of a method of providing a touch screen using frequency sensitive microchips applied in a coating of paint. The method begins at step 1 of the process flow illustrated in FIG. 1 with microchips with paint to provide a random distribution of the microchips in the paint. The term "paint" as used herein describes a liquid medium that includes a solvent for carrying the microchips to a surface to be coated. When the paint is applied to a substrate surface for providing the touch screen, the solvent may evaporate providing a coating on substrate including the micro-chips. The paint system may also include a binder and at least one pigment. In some embodiments, the paint system can also include wetting agents, dispersants, antifoam agents, stabilizers, deflocculates and other types of additives typically used in paint.

Figure 2:
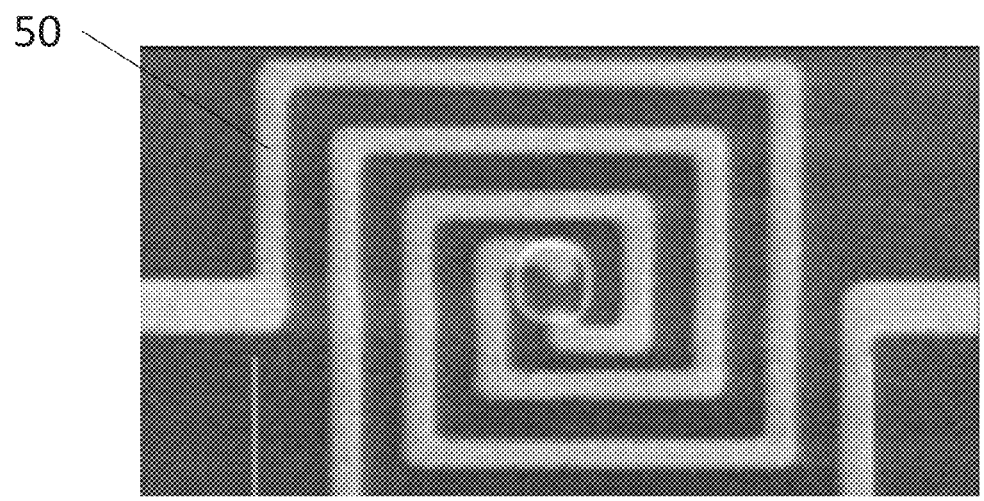
FIG. 2 is a top down view of an RFID coil as used on the touch sensitive microchips, in accordance with one embodiment of the present invention.

The microchips can have a maximum size, i.e., at least a maximum height, width or depth dimension, that is no greater than 0.25 inches. In some embodiments, the components included on the microchips that are employed in the methods describe herein include an integrated circuit for light signal processing, transmission of signal, receiving of signal, and memory of an identification for the chip. In some embodiments, the microchips include a capacitor sensor, a light sensor or a combination of the capacitor sensor and a light sensor. The light sensor may be provided by a diode, such as a photodiode. The microchips may also include an antenna structure, such as a nano antenna. In some embodiments, the microchips can include an on-board power source, such as a battery. One example of a radio frequency (RF) antennae that can be used in the embodiments employing radio frequency identification (RFID) is depicted in FIG. 2. In some other embodiments, the microchips do not include an on-board power source, such as a battery. In these embodiments, the microchips can be energized by radio frequency from a marker or a projector.

Figure 3:
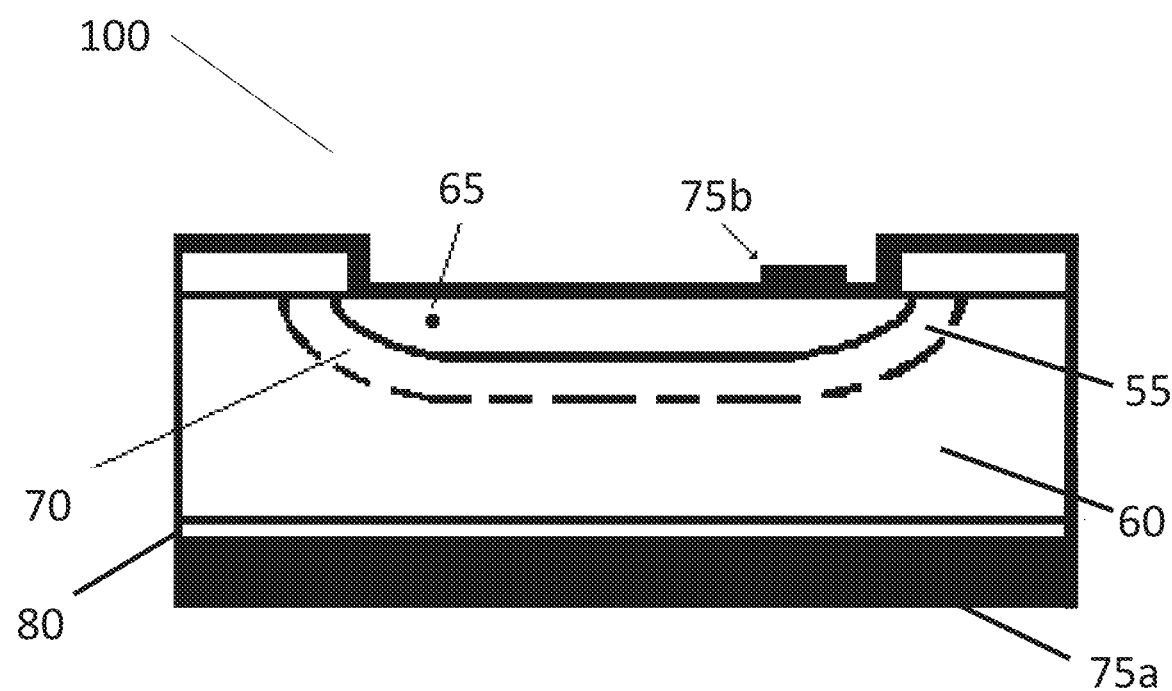
FIG. 3 is a side cross sectional view of a touch sensitive microchip, in accordance with one embodiment of the present invention.

FIG. 3 illustrates one embodiment of a microchip 100 that can be used with the embodiment described with reference to FIG. 1, as well as the other embodiments that are described below with reference to FIGS. 4-6. In some embodiments, the microchip 100 may include a pn junction 55, which is formed in a bulk substrate 60 that is composed of silicon and doped to a n-type conductivity. The pn junction 55 includes an active area 66 doped to a p-type conductivity. Present between the active area 65 and the bulk semiconductor substrate 60 is a depletion region 70. In some embodiments, the microchip 100 may further include a metallized contact 75a, 75b and a n-type back contact diffusion region 80 that is formed in the bulk semiconductor substrate 60. The microchip 100 may include an RF antennae, as depicted in FIG. 2. The microchip 100 may further include a photodiode to provide a light sensor for the microchip 100. The light sensor can enable the microchip 100 to sense light from a specific pattern when an image is projected, and in some instances traversed across onto a network of the microchips 100 the provide the touchscreen. The RF antennae 50, as depicted in FIG. 2, is one example of how the microchip 100 may communicate with a computer.

Referring back to FIG. 1, in some embodiments, the paint and the microchips 100 may be combined at step 1 through manual mixing, motorized mixing, high speed mixing, or any other mixing method. In the method that is describe with reference to FIG. 1, the microchips are radio frequency microchips. These microchips 100 may be passive and powered using an RF transmitter/receiver similar to RFID methods.

At step 2 of the method described with reference to FIG. 1, the coating of the paint and the microchips can be applied to the substrate using painting methods such as spraying and brushing. In some examples, the paint including the microchips can be applied by aerosol cans. In one example, the paint including the microchips can be an enamel based paint, e.g., a white colored paint, that includes microchips having dimensions ranging from 100 microns×100 microns to 635 microns×635 microns.

Although the coating is described herein as being applied to a wall, the coating may be applied to any surface. In some examples, the surface to which the coating is applied to provide a touch screen is a flat surface or relatively flat surface. In addition to walls, the coatings described herein can also be applied to desk tops, counter tops, ceilings, flooring, as well as any other surface on which a touch screen may be desired.

Turning to step 3 of the method described with reference to FIG. 1, once the coating is deposited, the location of the microchips can be calibrated. In the embodiment that is described with reference to FIG. 1, the location of the microchips can be calibrated using a calibration image that is projected onto the coating including the microchips that is coated onto the substrate. The calibration image may include colors and shapes and alignment features that can be sensed by the microchips 100 in the coating. More specifically, the light sensors, e.g., photodiodes, integrated into the microchips can sense the colors and/or shapes and/or alignment features of the calibration image, and can send a signal including the location and identification of the microchips to a calibration apparatus for a projector that subsequently projects an image for a touch screen interface onto the coating including the microchips. The calibration apparatus can employ machine learning, such as recurrent neural networks (RNN), to classify which of the signals are being detected, e.g., a light signal, capacitance signal and/or RF signal, and the signals can be stored using a form of memory which can include cloud type memory. In some embodiments, machine learning can identify if the calibration signal is reliable. Convolutional neural networks (CNN) can be used to train the system for expected signal types indicative of a calibrated signal in comparison to a faulty signal.

At step 4 of the method depicted in FIG. 1, a touch screen image may be projected onto the coating of the microchips. The touch screen image includes at least one feature that can be activated by the user to provide an interface with a computer. This feature may be a select button on a touch screen image, a text box, an expandable menu, a search box or any other feature of a graphical interface used in computers. In some embodiments, because the location of the microchips has been previously determined, the touch screen images is positioned on the coating to align at least one feature that is to be selected, i.e., activated, as part of a graphical interface with a computer, to at least one microchip in the coating.

Turning to step 5, the method illustrated in FIG. 1 can continue with a user using the touch screen that has been described above, i.e., the touch screen image projected on the coating including the dispersed microchips, to interface with a computer, e.g., interface with the graphical user interface of a computer. Step 5 can include activation of the radio frequency sensitive microchips by contacting a feature of the touch screen image projected onto the coating with a pointer device including an RFID reader. RFID is an acronym for "radio-frequency identification" and refers to a technology whereby digital data encoded in RFID tags, i.e., radio frequency sensitive microchips, are captured by a reader via radio waves. In this embodiment, the microchips may function as an RFID tag and include an integrated circuit and an antenna, which are used to transmit data to the pointer using the RFID reader (also called an interrogator). The reader then converts the radio waves to a more usable form of data. Information collected from the tags is then transferred through a communications interface to a computer system that the touch screen including the coating of microchips is communicating with. At the computer system, the data can activate a function that is correlated to the feature being projected with the touch screen image that is being selected by the RFID reader by interaction with the correlated radio frequency sensitive microchip.

It is noted that this is only one example of a touch screen that can be provided by the methods, structures and systems that are described herein. FIG. 4 illustrates another method of providing a touch screen using frequency sensitive or capacitance sensitive microchips applied in a wall paper covering that is applied to a substrate.

Figure 4:
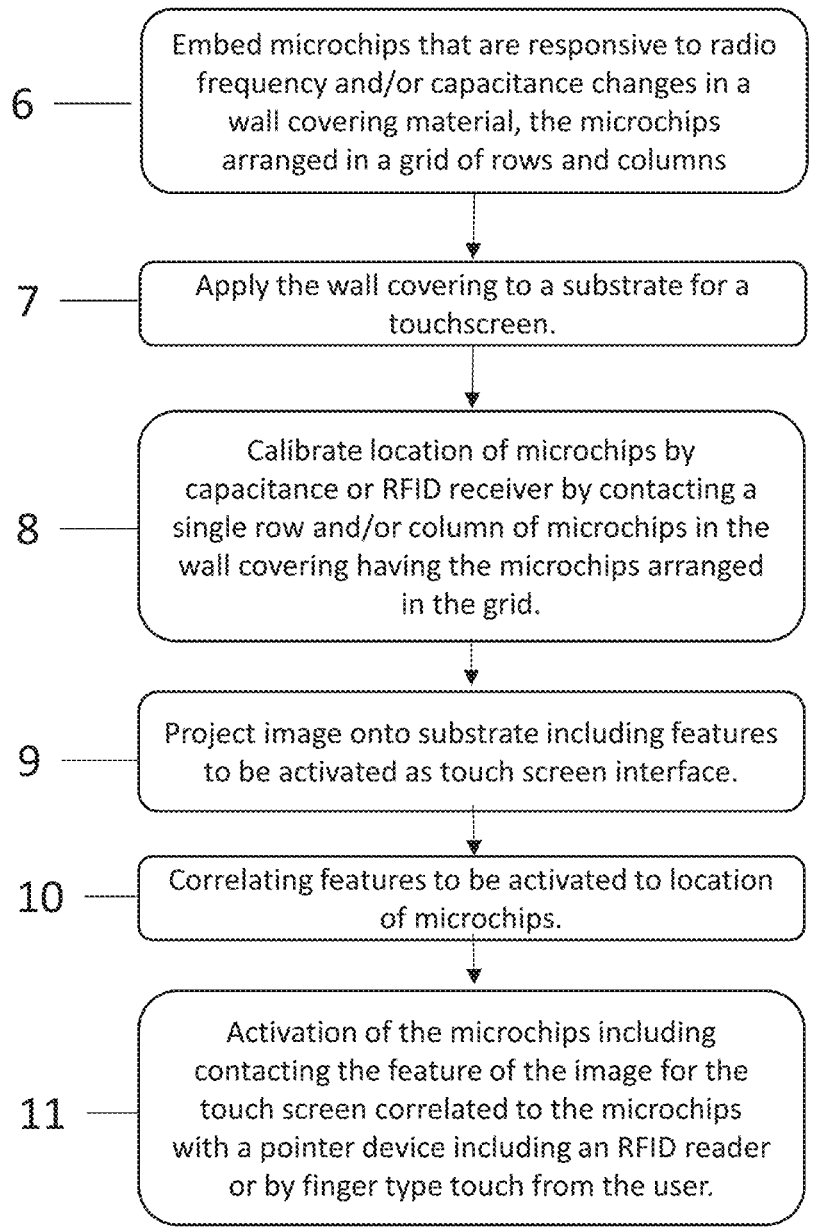
FIG. 4 is a flow diagram showing a method of providing a touch screen using frequency sensitive or capacitance sensitive microchips applied in a wall paper covering that is applied to a substrate, in accordance with an embodiment of the present invention.

Referring to FIG. 4, the method may begin with step 6 which includes affixing the microchips to a wall covering. The microchips employed in the embodiments described with reference to FIG. 4 may be radio sensitive microchips that are activated by an RFID reader as described in the embodiments described with reference to FIG. 3; or the microchips employed in the embodiments described with reference to FIG. 4 may sense capacitance changes, i.e., be capacitance sensitive. While the radio frequency microchips may be passive chips that can be activated, i.e., draw power from, the RFID reader; the microchips that are capacitance sensitive are powered using an on chip battery source or by a RF coil that is present on the back surface of the coating, i.e., is present on the surface that the wall covering is deposited on. In either case, further details for the microchips have been described above with reference to FIGS. 2 and 3.

The wall covering may be a flexible substrate. The composition of the wall covering may be polymer, or the wall covering may be paper. For example, the wall covering can be in the form of rollable vinyl. The microchips may be affixed using adhesive bonding. In other examples, the microchips may be laminated to the wall covering. In yet other examples, the wall covering may be a composite in which the wall covering substrate is the matrix of the composite, and the microchips can be the dispersed phase that is embedded therein.

In the embodiment that is described with reference to FIG. 4, the microchips can be affixed to the wall covering in a grid of rows and columns. In some examples, the microchips that are arranged in the rows and columns are equally spaced from their neighbors. The spacing between adjacent microchips can be by an equal repeating pitch. This grid arrangement of the microchips that are affixed to the wall covering can provide an embodiment that needs less calibration than the touch screens formed using a coating of microchips, in which the microchips can be randomly dispersed.

Referring to FIG. 4, the method can continue with step 7, which includes applying the wall covering to a substrate for a touchscreen. The application of the wall covering to the substrate may include adhesive bonding or wall paper paste. The substrate may be a wall surface similar to the embodiments that are described above with reference to FIG. 1. The substrate may also be a ceiling surface, countertop surface, flooring surface and desktop surface.

At step 8 of the method depicted in FIG. 4, the location of the microchips can be calibrated by capacitance measurements using the microchips, or by communicating with the radio frequency sensitive microchips with a radio frequency receiver, i.e., RFID receiver. More specifically, in some embodiments, by contacting a single row and/or column of microchips in the fixed grid of microchips in the wall covering, the location of the entirety of the microchips can be determined therefore calibrating the grid of microchips for use in a touch screen application. For the embodiments, in which the microchips are radio frequency sensitive microchips, contacting the microchips may include contacting microchips with a pointer having an integrated radio frequency transmitter/receiver, i.e., RFID transmitter/receiver. In some embodiments, the radio frequency sensitive microchips are passive and are powered by the RF signal from the RFID transmitter/receiver. For the embodiments, in which the microchips are capacitance sensitive microchips, contacting the microchips may include a pressure that is applied to the microchips that changes the capacitance reading of the microchips. The capacitance sensitive microchips are typically powered by an on board battery, or an RF coil that is backing the substrate on which the touch screen is being formed. Because the microchips are positioned in fixed rows and columns, and the spacing and number of the microchips can be known, calibration of an entire grid of microchips can be provided by sensing a single row or column of microchips.

At step 9 of the method depicted in FIG. 4, a touch screen image may be projected onto the coating of the microchips. The touch screen image includes at least one feature that can be activated by the user to provide an interface with a computer. This feature may be a select button on a touch screen image, a text box, an expandable menu, a search box or any other feature of a graphical interface used in computers.

At step 10 of the method depicted in FIG. 4, the features from the touch screen image that are to be activated as part of the user interface with a computer are correlated to a location of microchips. In some embodiments, because the location of the microchips is known, the touch screen images are positioned on the wall covering to align at least one feature that is to be selected, i.e., activated, as part of a graphical interface with a computer, to at least one microchip in the wall covering.

At step 11 of the method depicted in FIG. 4, the method can continue with a user using the touch screen that has been described above, i.e., the touch screen image projected on the coating including the dispersed microchips, to interface with a computer, e.g., interface with the graphical user interface of a computer. Step 11 can include activation of the radio frequency sensitive microchips by contacting a feature of the touch screen image projected onto the coating with a pointer device including an RFID reader. The use of an RFID reader pointer device or marker has been further described above in step 5 of FIG. 1. Therefore, the description of the use of the RFID reader and its interaction with the radio frequency sensitive microchips to provide a touch screen interface with a computer that is provided above in the description of step 5 of FIG. 1 can provide one example of how to activated the radio frequency sensitive microchips for step 11 of FIG. 4. In the embodiments in which the microchips are capacitance sensitive, a marker or pointer is not necessary. In this example, a user can interface with the touch screen using only his or her finger tips, i.e., finger type touch. In this example, when the user contacts a capacitance sensitive microchip, the capacitance of the microchip changes, which provides signal for activation of a feature on touch screen image. In some examples, the capacitance sensitive microchip includes a dielectric coating atop an electrode, wherein the users fingertip on the opposing side of the dielectric coating that the electrode is in contact with provides a second electrode to provide a capacitor relationship. In some embodiments, the interaction of the fingertip with the dielectric creates a change in the dielectric constant, which changes the capacitance of the capacitor, which provides for the signal illustrating activation of a feature on the touch screen image.

Information collected from the microchips is then transferred through a communications interface to a computer system that the touch screen including the coating of microchips is communicating with. At the computer system, the data can activate a function that is correlated to the feature being projected with the touch screen image that is being selected by the RFID reader by interaction with the correlated radio frequency sensitive microchip.

Similar to the embodiments that are described with reference to FIG. 1, the method depicted in FIG. 4 can employ machine learning to process the plurality of signals provided by the microchips. Recurrent Neural Networks (RNN) or any other machine learning methods can be applied to classify which of the signals are being detected. All of such signal detection results could be stored in the cloud for further analytics. Further, machine learning can be used to identify if the read signal is reliable. Convolutional Neural Network (CNN) can also be used to train the system for expected sensory values and identifying faulty sensor data. RNN is also applicable as the signal pattern can be repeating.

It is noted that this the embodiments described with reference to FIG. 4 are only one example of a touch screen that can be provided by the methods, structures and systems that are described herein. FIG. 5 illustrates another method of providing a touch screen using frequency sensitive microchips that is applied in a coating of paint, in which the chips are calibrated by scanning the entirety of the substrate with an RFID reader.

Figure 5:
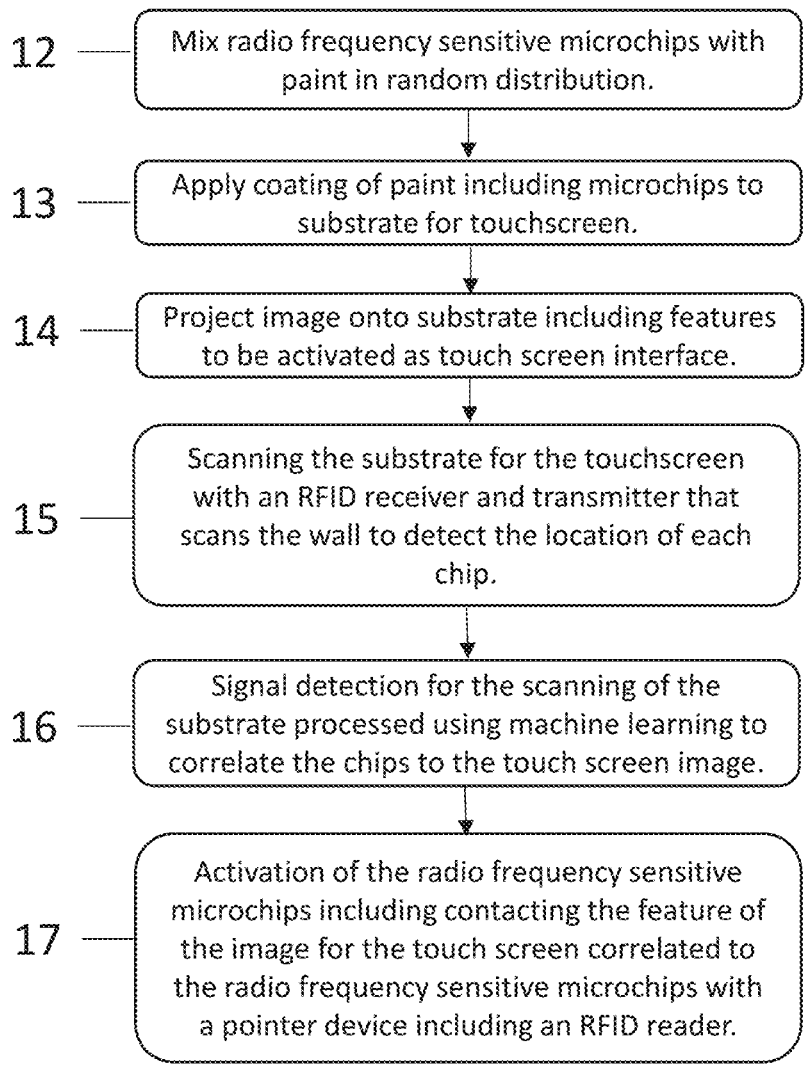
FIG. 5 is a flow diagram showing a method of providing a touch screen using frequency sensitive microchips applied in a coating of paint, in which the chips are calibrated by scanning the entirety of the substrate with a RFID reader, in accordance with an embodiment of the present invention.

The method depicted in FIG. 5 can begin with step 12 which includes mixing radio frequency sensitive microchips with paint in random distribution, and step 13 which includes applying a coating of paint including microchips to substrate for providing a touchscreen. The description of steps 1 and 2 from FIG. 1 can provide one embodiment of steps 12 and 13 in FIG. 5.

In a following step, a touch screen image may be projected onto the coating of the microchips at step 14. The touch screen image includes at least one feature that can be activated by the user to provide an interface with a computer. This feature may be a select button on a touch screen image, a text box, an expandable menu, a search box or any other feature of a graphical interface used in computers.

Turning to step 15, the method continues with scanning the substrate for the touchscreen with an RFID receiver and transmitter to detect the location of each chip. In this embodiment, the microchips may function as an RFID tag and include an integrated circuit and an antenna, which are used to transmit data to the pointer using the RFID reader (also called an interrogator). The reader then converts the radio waves to a more usable form of data. Information collected from the tags is then transferred through a communications interface to a computer system that the touch screen including the coating of microchips is communicating with.

At step 16 of the method illustrated in FIG. 5, the method continues with signal detection for the scanning of the substrate processed using machine learning to correlate the chips to the touch screen image. The method can employ machine learning to process the plurality of signals provided by the microchips. Recurrent Neural Networks (RNN) or any other machine learning methods can be applied to classify which of the signals are being detected, and which correlated to a feature of the touch screen image that can be activated. All of such signal detection results could be stored in the cloud for further analytics. Further, machine learning can be used to identify if the read signal is reliable. Convolutional Neural Network (CNN) can also be used to train the system for expected sensory values and identifying faulty sensor data. RNN is also applicable as the signal pattern can be repeating.

A user can than interact with the touch screen image at step 17. Activation of the radio frequency sensitive microchips can include contacting the feature of the image for the touch screen correlated to the radio frequency sensitive microchips with a pointer device including an RFID reader. In this embodiment, the microchips may function as an RFID tag and include an integrated circuit and an antenna, which are used to transmit data to the pointer using the RFID reader (also called an interrogator). The reader then converts the radio waves to a more usable form of data. Information collected from the tags is then transferred through a communications interface to a computer system that the touch screen including the coating of microchips is communicating with. At the computer system, the data can activate a function that is correlated to the feature being projected with the touch screen image that is being selected by the RFID reader by interaction with the correlated radio frequency sensitive microchip.

It is noted that this is only one example of a touch screen that can be provided by the methods, structures and systems that are described herein. FIG. 6 illustrates another method of providing a touch screen using frequency sensitive or capacitance sensitive microchips applied in a wall paper covering that is applied to a substrate.

Figure 6:
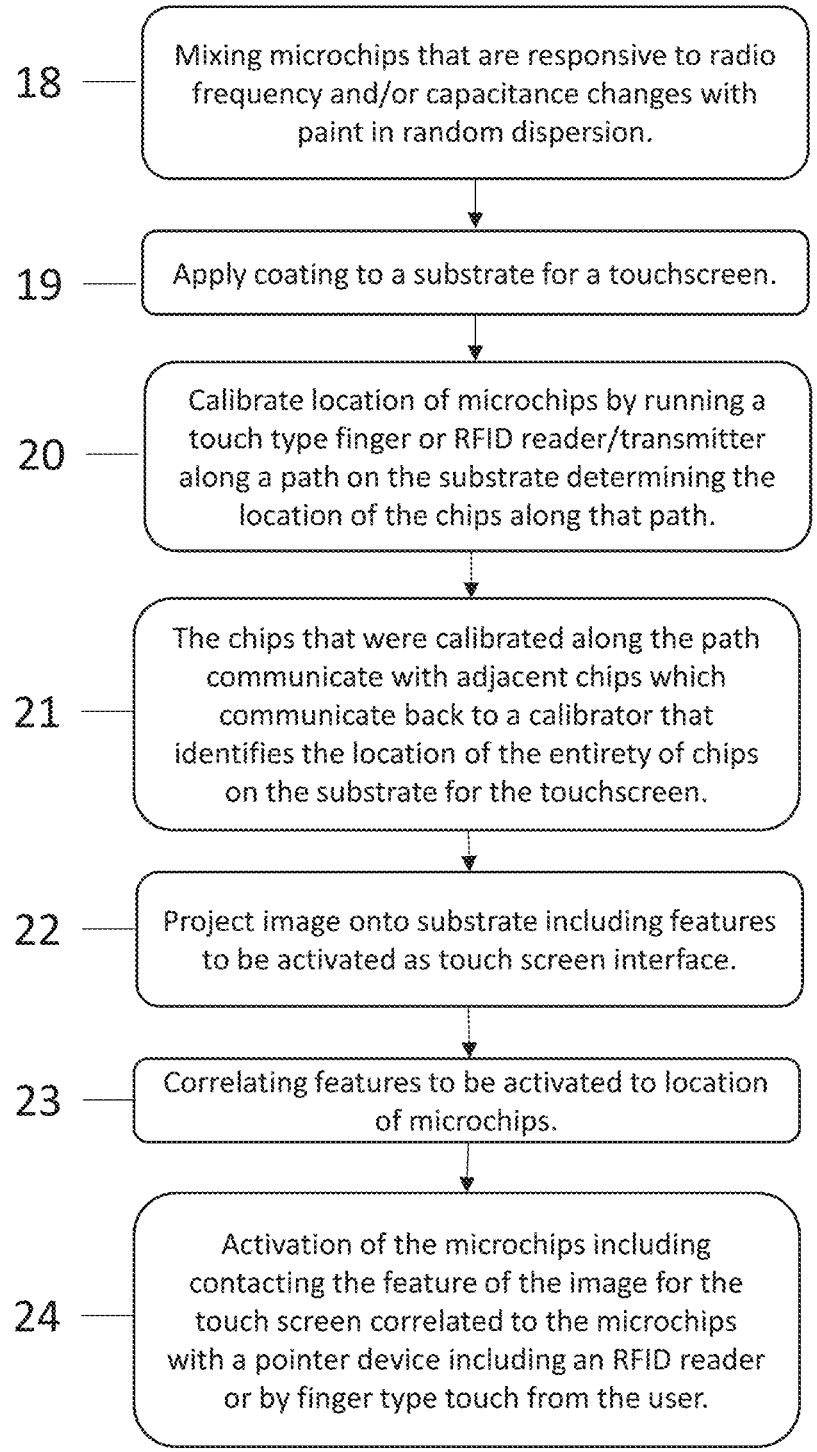
FIG. 6 is a flow diagram showing a method of providing a touch screen using frequency sensitive microchips applied in a coating of paint, in which the chips are calibrated employing intercommunication between adjacent chips, in accordance with an embodiment of the present invention.

Step 18 of the method depicted in FIG. 6 includes mixing microchips that are responsive to radio frequency and/or capacitance changes with paint in random dispersion. Step 19 of the method depicted in FIG. 6 includes applying a coating to a substrate for a touchscreen. The description of steps 1 and 2 from FIG. 1 can provide one embodiment of steps 18 and 19 in FIG. 6.

Thereafter, running a touch type finger or RFID reader/transmitter along a path on the substrate can calibrate the location of those microchips by determining the location of those chips along that path at step 20. As described above, the radio frequency sensitive microchips are calibrated using an RFID reader/transmitter that activated the radio frequency sensitive microchips that function similar to an RF tag, which may be passive tags, i.e., energized only by the RF signal. The capacitance sensitive microchips may have their own power source, i.e., on chip battery, but may also be powered by an RF coil backing the coating. Touching the capacitance sensitive chips by finger changes the capacitance of the capacitor structure present thereon, which can provide a signal indicating location of the chip.

At step 21, the chips that were calibrated along the path communicate with adjacent chips which communicate back to a calibrator that identifies the location of the entirety of chips on the substrate for the touchscreen. The chips may communicate with one another using a nano-antenna that is integrated onto the chip. This can be accomplished using a form of near field communication.

Turning to step 22, a touch screen image including features to be activated can be projected onto the substrate to provide a touch screen interface. The touch screen image includes at least one feature that can be activated by the user to provide an interface with a computer. This feature may be a select button on a touch screen image, a text box, an expandable menu, a search box or any other feature of a graphical interface used in computers.

In a following process step for the method illustrated in FIG. 6, the features of the touch screen image that are to be activated are correlated to the location of microchips as step 23. The location of the microchips is known from steps 20 and 21.

At step 24 of the sequence depicted in FIG. 6, the method can continue with a user using the touch screen that has been described above, i.e., the touch screen image projected on the coating including the dispersed microchips, to interface with a computer, e.g., interface with the graphical user interface of a computer. Step 24 can include activation of the radio frequency sensitive microchips by contacting a feature of the touch screen image projected onto the coating with a pointer device including an RFID reader. The use of an RFID reader pointer device or marker has been further described above in step 5 of FIG. 1. Therefore, the description of the use of the RFID reader and its interaction with the radio frequency sensitive microchips to provide a touch screen interface with a computer that is provided above in the description of step 5 of FIG. 1 can provide one example of how to activated the radio frequency sensitive microchips for step 24 of FIG. 6. In the embodiments in which the microchips are capacitance sensitive, a marker or pointer is not necessary. In this example, a user can interface with the touch screen using only his or her finger tips, i.e., finger type touch. In this example, when the user contacts a capacitance sensitive microchip, the capacitance of the microchip changes, which provides signal for activation of a feature on touch screen image. In some examples, the capacitance sensitive microchip includes a dielectric coating atop an electrode, wherein the users fingertip on the opposing side of the dielectric coating that the electrode is in contact with provides a second electrode to provide a capacitor relationship. In some embodiments, the interaction of the fingertip with the dielectric creates a change in the dielectric constant, which changes the capacitance of the capacitor, which provides for the signal illustrating activation of a feature on the touch screen image.

Information collected from the microchips is then transferred through a communications interface to a computer system that the touch screen including the coating of microchips is communicating with. At the computer system, the data can activate a function that is correlated to the feature being projected with the touch screen image that is being selected by the RFID reader by interaction with the correlated radio frequency sensitive microchip.

Similar to the above described embodiments, the method depicted in FIG. 6 can employ machine learning to process the plurality of signals provided by the microchips. Recurrent Neural Networks (RNN) or any other machine learning methods can be applied to classify which of the signals are being detected. All of such signal detection results could be stored in the cloud for further analytics. Further, machine learning can be used to identify if the read signal is reliable. Convolutional Neural Network (CNN) can also be used to train the system for expected sensory values and identifying faulty sensor data. RNN is also applicable as the signal pattern can be repeating.

Figure 7:
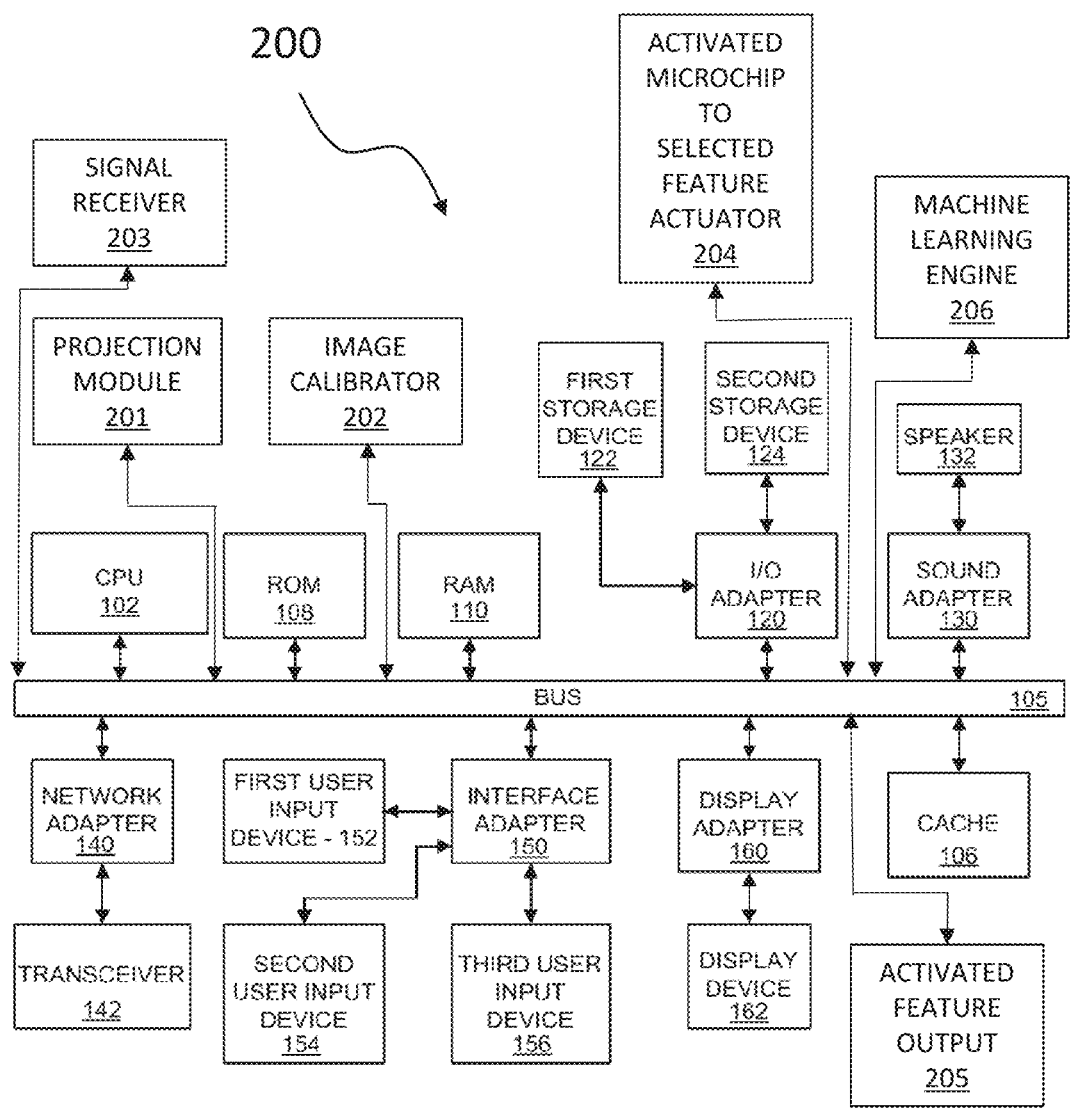
FIG. 7 is a block/flow diagram showing the components of one embodiment of a touch screen generator that can be integrated with the methods, structures and system depicted in FIGS. 1-6.

FIG. 7 depicts one embodiment of the components of a processing system 200 for providing a touch screen generator that can be integrated with the methods, systems and structures that are described with reference to FIGS. 1-6. In FIG. 7, the touch screen generator interacts with a coating or wall covering including a plurality of a touch activated microchips, and may include a projector module 201 for projecting a light image onto the coating that is applied to a touch screen substrate. The touch screen generator also includes an image calibrator 202 that calibrates touch activated microchips in the coating to features of the light image projected onto the coating; a receiver 203 for receiving signal from the touch activated microchips when said feature of the light image is activated; an activated microchip to selected feature actuator 204; and a transmitter 205 of activated features signal to a computer interfacing with the touch screen. Still referring to FIG. 7, the touch screen generator 200 may also include a machine learning engine 206.

The coatings, wall coverings, and microchips that the touch screen generator 200 communicates with have been described above with reference to FIGS. 1-6.

The projector module 201 may include at least one hardware processor and memory for containing instructions for operating a projector for providing a light image for the purposes of providing a touch screen image having features to be activated as part of an interface with a computer, as described above with respect to steps 4, 9, 14 and 22 of FIGS. 1 and 4-6, respectively. The projector module 201 may also provide the alignment image that is described in step 3 of FIG. 1.

The image calibrator 202 may also include memory for providing instructions to at least one hardware processor in order to provide the functions of calibrating the microchips in accordance with steps 3 and 4 of FIG. 1, steps 8 and 9 of FIG. 4, step 16 of FIG. 5, and steps 20 and 21 of FIG. 6.

The receiver 203 may be an RFID receiver for communicating with the microchips. The receiver 203 may also include memory for storing the signals received by the microchips, as well as at least one processor for analyzing the signals received from the microchips.

The activated microchip to selected feature actuator 204 may include memory including instructions for employing a processor, such as a hardware processor, to correlate a signal received by the receiver from an touch sensitive microchip that the user of the touch screen has activated a feature of the touch screen image to start a function. The activated microchip to selected feature actuator 204 can provide the functions that are described with respect to step 5 of FIG. 1, step 11 of FIG. 4, steps 16 and 17 of FIG. 5 and step 24 of FIG. 6.

The transmitter 205 of activated features signal to a computer interfacing with the touch screen is one output from the touch screen generator. It may transmit the signal wirelessly or over a hard line connection to the computer.

The machine learning engine 206 may provide the machine learning functions, such as those provided through recurrent neural networks (RNN) and convolutional neural networks (CNN), that have been described above with reference to FIGS. 1-6.

The projector module 201, image calibrator 202, the receiver 203, the activated microchip to selected feature actuator 204, the transmitter 205 of activated features signal to a computer interfacing with the touch screen, and the machine learning engine 206 are depicted in electrical communication with the system bus 105.

The processing system 200 may also includes at least one processor (CPU) 102 operatively coupled to other components via a system bus 105. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 105.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. A speaker 132 is operatively coupled to system bus 102 by the sound adapter 130. A transceiver 142 is operatively coupled to system bus 102 by network adapter 140. A display device 162 is operatively coupled to system bus 102 by display adapter 160. A first user input device 152, a second user input device 154, and a third user input device 156 are operatively coupled to system bus 102 by user interface adapter 150. The first input device 152 may be receive an image from the scanning electron microscope (SEM) providing the automated nano-scale imaging 23 and/or a cross-section transmission electron microscope (TEM) 24. The second input device 154 may be an input for the optical critical dimensions (OCD) 21, 31 are taken using an optical diffraction measurement as part of the historical data 20 track or the production track 30. The third input device 156 may be an input for electrical performance measurements taken from the in line electrical property testing apparatus 22 of the historical data track 20 and/or the in line electrical property testing apparatus 32 of the production track 30. The system depicted in FIG. 7 may also include other input devices, such as any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The system may further include an output device 158 for providing instructions to the apparatus actuator 35.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system, structure and method for a paint one microchip touch screen, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for forming a touch screen comprising:
applying a liquid coating including, suspended therein, a plurality of radio frequency (RF) sensitive microchips to a substrate for a touch screen, each of the microchips including an antenna structure and a memory containing a chip identification;
calibrating the radio frequency sensitive microchips to features of an image for a touch screen interface projected on the substrate; and
activating the radio frequency sensitive microchips that are calibrated to the features of the image to activate the features of the touch screen interface.

2. The method of claim 1, wherein applying the coating includes spraying a liquid containing the plurality of radio frequency sensitive microchips.

3. The method of claim 1, wherein the coating is a wall covering having the radio frequency sensitive microchips present therein.

4. The method of claim 1, wherein the radio frequency sensitive microchips comprise a coil for at least one of receiving and sending RF signals.

5. The method of claim 1, wherein the radio frequency sensitive microchips include a light sensor.

6. The method of claim 5, wherein calibrating the radio frequency sensitive microchips includes projecting a light image to the plurality of radio frequency sensitive microchips in the coating, and sensing, with the light sensor, alignment objects in the light image for calibrating a location of the radio frequency sensitive microchips to the features of the image for the touch screen interface.

7. The method of claim 1, wherein activating the radio frequency sensitive microchips includes contacting the features of the image for the touch screen correlated to the radio frequency sensitive microchips with a pointer device including an RFID reader.

8. The method of claim 1, wherein the radio frequency sensitive microchips include a battery power source.

9. The method of claim 1, wherein the radio frequency sensitive microchips are powered by an RF coil backing the coating.

10. A system for a touch screen interface comprising:
a coating applied as a liquid to a touch screen substrate that includes, suspended therein, a plurality of touch activated microchips, each including an antenna and a memory containing a chip identification;
an image calibrator that calibrates the touch activated microchips in the coating to at least one light image, having activation fields, projected on to the coating;
a receiver configured receiving signal from the touch activated microchips when a feature of the light image is activated;
a feature actuator configured to correlate a signal received by the receiver from one of the touch activated microchips with an associated one of the activation fields; and
a transmitter configured to send a signal to a computer interfacing with the touch screen interface instructing that the associated activation field has been selected.

11. The system of claim 10, wherein each of the activation fields is associated with a respective function executable by a computer.

12. The system of claim 10, wherein the touch activated microchips include a radio frequency (RF) coil and are activated by a radio signal from an RFID reader on a pointer applied to a feature on the light image.

13. The system of claim 10, wherein the touch activated microchips include a battery power source.

14. The system of claim 10, wherein the touch activated microchips are powered by a radio frequency (RF) coil.

15. The system of claim 10, wherein the coating comprises a paint liquid including at least one of a solvent, pigment, binder and said touch activated microchips.

16. The system of claim 10, wherein the coating comprises a wall covering including said touch activated microchips.

17. A touch screen comprising:
a coating applied to a substrate for a touch screen, the coating including, suspended therein, a plurality of radio frequency (RF) sensitive microchips having an antenna structure and a memory containing a chip identification;
a touch screen interface projected onto the coating, the RF sensitive microchips are calibrated to features of the image of the touch screen interface; and
a processor configured to activate one of the features of the image when one of the RF sensitive microchips corresponding to that feature is activated.

18. The touch screen of claim 17, wherein the RF sensitive microchips include a light sensor.

19. The touch screen of claim 18, wherein the RF sensitive microchips are calibrated by projecting a light image to the plurality of RF sensitive microchips in the coating, such that the light sensor senses alignment objects in the light image for calibrating the location of the RF sensitive microchips to the features of the image for the touch screen interface.

20. The touch screen of claim 17, wherein the RF sensitive microchips are powered by an RF coil.

* * * * *